US006778598B2

(12) United States Patent
Happonen et al.

(10) Patent No.: US 6,778,598 B2
(45) Date of Patent: Aug. 17, 2004

(54) METHOD FOR MODIFYING THE CHANNEL IMPULSE RESPONSE IN TDMA SYSTEMS

(75) Inventors: Aki Happonen, Kiiminki (FI); Olli Piirainen, Oulu (FI)

(73) Assignee: Nokia Corporation, Espoo (FI)

( * ) Notice: Subject to any disclaimer, the term of this patent is extended or adjusted under 35 U.S.C. 154(b) by 603 days.

(21) Appl. No.: 09/846,987

(22) Filed: May 1, 2001

(65) Prior Publication Data

US 2002/0015459 A1 Feb. 7, 2002

Related U.S. Application Data

(63) Continuation of application No. PCT/EP98/07392, filed on Nov. 18, 1998.

(51) Int. Cl.[7] .................................................. H03H 7/40
(52) U.S. Cl. ........................ 375/231; 375/232; 375/346; 455/296; 455/307; 708/322
(58) Field of Search ................................ 375/229–232, 375/260, 285, 346, 350; 455/67.3, 296, 303, 307; 370/321, 337, 347, 442, 478; 708/322, 323

(56) References Cited

U.S. PATENT DOCUMENTS

| 5,251,233 A | | 10/1993 | Labedz et al. | |
|---|---|---|---|---|
| 5,303,268 A | | 4/1994 | Tsutsumi et al. | |
| 5,325,402 A | | 6/1994 | Ushirokawa | |
| 5,519,727 A | * | 5/1996 | Okanoue et al. | ............. 375/232 |
| 5,673,294 A | * | 9/1997 | Namekata | ................... 375/341 |
| 5,867,531 A | * | 2/1999 | Shiino et al. | ................ 375/262 |
| 6,631,160 B2 | * | 10/2003 | Piirainen et al. | ............ 375/231 |

FOREIGN PATENT DOCUMENTS

EP 0793359 A 9/1997

OTHER PUBLICATIONS

International Search report for PCT/EP98/07392.

* cited by examiner

*Primary Examiner*—Stephen Chin
*Assistant Examiner*—Dac V. Ha
(74) *Attorney, Agent, or Firm*—Squire, Sanders & Dempsey L.L.P.

(57) ABSTRACT

The present invention proposes a device for processing received signals (y) having been transmitted via a transmission channel (1), comprising: estimation means (2, 2a) adapted to obtain an estimated impulse response function ($h_k$) of said channel (1) based on said received signals (y) which are received at a first time; derivation means (3; 3a–3f) adapted to derive history information ($win_k$) based on at least one previously estimated impulse response function, calculation means (4; 4a, 4b) adapted to calculate modifying information ($mwin_k$) on the basis of said history information ($win_k$), and modification means (5) adapted to modify said estimated impulse response function ($h_k$) of said channel (1) obtained on the basis of said received signals (y), by applying said modifying information ($mwin_k$) to said estimated impulse response function ($h_k$) of said channel obtained on the basis of said received signals (y), and adapted to output a modified impulse response function ($hm_k$). The present invention also proposes a corresponding method.

14 Claims, 4 Drawing Sheets

METHOD FOR MODIFYING THE CHANNEL IMPULSE RESPONSE IN TDMA SYSTEMS

This application is a continuation of international application serial number PCT/EP98/07392, filed 18 Nov. 1998.

FIELD OF THE INVENTION

The present invention relates to a method for processing received signals having been transmitted via a transmission channel and also relates to a corresponding device. In particular, the present invention is directed to a method and corresponding device for modifying the channel impulse response in TDMA systems.

BACKGROUND OF THE INVENTION

Recently, mobile radio telecommunication systems have widely spread. Such mobile radio telecommunication systems operate for example according to a commonly agreed standard, like for example the GSM standard. According to GSM standard, data transmission is performed according to a method of time divisional multiple access (TDMA). The TDMA transmission principle specifies that data are transmitted from a transmitter to a receiver and vice versa only during respectively specified time slots of frames.

Data transmission in such telecommunication systems substantially relies on digital data transmission. However, between a mobile radio transceiver device as a subscriber terminal (hereinafter: mobile station MS) and a stationary radio transceiver device as a serving radio network element (hereinafter: base station BS) data have necessarily to be transmitted as analogue data via the air interface $U_m$.

Consequently, data transmitted by the mobile station MS are received via a base station antenna means of a reception device of the base station BS as analogue data. In the course of the further processing of the thus received data by the reception device, the analogue data are analog to digital converted, i.e. passed through an A/D converter means. At the next stage of the processing, the obtained digital data are supplied to an equalizer means for being equalized. The thus obtained output data are then supplied to a channel codec means for coding/decoding the data. At the reception side, decoding is performed to separate received speech data from associated signaling data.

Particular attention in the course of this processing has to be paid to the equalizing of the received data, since the equalizing is required to reconstruct, at the reception side, the transmitted signal from a mixture of received signals.

For example, assuming a situation in a radio telecommunication network with a base station BS and only a single mobile station MS present in the radio coverage area of the base station. Then, a signal s transmitted from the mobile station MS may reach the base station BS directly via line of sight at a time s(t). However, the same signal s may be deflected by, e.g., a building, a mountain or the like present in the environment. Thus, the same signal may reach the base station BS at a later point of time s(t+T), and is thus superposed to the signal s(t). Due to the delay T, both received signals are no longer in phase with each other. Moreover, the delayed signal s(t+T) may even be more attenuated than the signal s(t) due to the longer transmission path. Thus, the signal received by the base station BS and originating from the mobile station MS is distorted. Now, assuming that another mobile station MS' is additionally present, then signals s'(t'), s'(t'+T') are additionally received by the base station BS, which may lead to interference between the respective transmitted data symbols (intersymbol interference).

Therefore, an equalizer means has to reconstruct (detect) the initially transmitted signal s(t) and/or s'(t') from the received mixture of signals s(t), s(t+T), s'(t'), s'(t'+T').

The thus reconstructed (or detected) signal is required to be as similar to the originally transmitted signal as possible. This reconstruction is therefore a main concern when designing equalizers, e.g. for use in a reception device of a base station BS.

Hitherto, in equalizers of reception devices used in mobile telecommunication systems, the channel impulse response (CIR) is estimated, and the thus estimated channel impulse response is used to detect, i.e. to reconstruct the transmitted data symbols.

The estimated channel impulse response is usually based on the received samples of the stream of data symbols. Therefore, it is an estimate of the actual (observed) channel impulse response. However, an error in the channel impulse response leads to a degraded performance when detecting/reconstructing transmitted data symbols from received data symbols.

In a previous solution, the above described estimated channel impulse response is assumed to be ideal, thereby disregarding errors, and it is used as it is for data symbol reconstruction. However, this solution was unsatisfactory due to the error in the observed channel impulse response being not taken into account.

Another known solution for improving the performance of an equalizer is disclosed in document U.S. Pat. No. 5,251,233 by Labedz et. al., assigned to Motorola Inc. The basic idea described therein is to estimate the energy of taps in the impulse response. Those taps having an energy below a predetermined threshold level are zeroed in order to reduce noise in the estimated channel impulse response. This previously proposed method may be applied to complex taps or real taps, i.e. may be performed separately for real and imaginary taps. The method disclosed in the Labedz patent improves (i.e. reduces) the bit error rate BER in the reproduced detected signal (which is an indication for the quality of a receiver) in situations where the channel interference ratio C/I or C/(I+N), respectively, with N being a noise signal superposed to an interfering signal, is low and the channel has a poor quality. The method is also beneficial in channels having a short impulse response. (The term taps refers to coefficients of each respective delay element of the corresponding FIR model for the used circuitry. Thus, based on the tap values, poles and zeroes of the transmission function may be calculated.)

However, under good channel conditions, the method as proposed by Labedz et. al. even degrades the receiver performance which may be attributable to the zeroing of amplitude coefficients of certain taps.

Document EP-A-0 793 359 A2 dicloses a method and a corresponding device for processing received signals having been transmitted via a transmission channel according to the preamble of the independent claims 1 and 8, respectively.

Likewise, also document U.S. Pat. No. 5,303,263 discloses a method and a corresponding device for processing received signals having been transmitted via a transmission channel according to the preamble of the independent claims 1 and 8, respectively.

Also, document U.S. Pat. No. 5,325,402 discloses a method and a corresponding device for processing received signals having been transmitted via a transmission channel according to the preamble of the independent claims 1 and 8, respectively.

SUMMARY OF THE INVENTION

Consequently, it is an object of the present invention to provide a method for processing received signals having been transmitted via transmission channel, and to provide a corresponding device which further improve the receiver performance.

This object is achieved by a method for processing received signals having been transmitted via a transmission channel as set out in claim 1.

Furthermore, this object is achieved by a device for processing received signals having been transmitted via a transmission channel as set out in claim 8.

Advantageous further developments are as set out in the respective dependent claims.

According to the present invention, the proposed method is very easy to implement, and the corresponding device may use a hardware structure of low complexity. According to first results obtained with devices to which the present invention has been implemented, the receiver performance is greatly improved in terms of a reduced bit error rate. The bit error rate is in average reduced by a factor of ⅓ as compared to a known prior art arrangement without the present invention being implemented. In particular, the present inventors found out that the present invention greatly improves the receiver performance in "short channels". The expression "short channels" in this connection means a static channel (i.e. permanently assigned or active) as well as channels established in rural areas representing a rather plane countryside environment. The present invention also improves channels established in hilly terrain and also in channels established in a typical urban environment, while, however, the improvements in this connection are slightly less significant as compared to those achieved in connection with "short channels".

Moreover, the present invention may easily be applied to and combined with other concepts for channel impulse response improvements, as for example those concepts described in the international patent application no. PCT/EP98/04562 of the same applicant. Such combination may be achieved by additionally supplying a respective further control signal (modifying signal) to a modification means for modifying the estimated channel impulse response function.

Preferred embodiments of the present invention are described herein below in detail with reference to the accompanying drawings.

DESCRIPTION OF PREFERRED EMBODIMENTS

Figure 1:
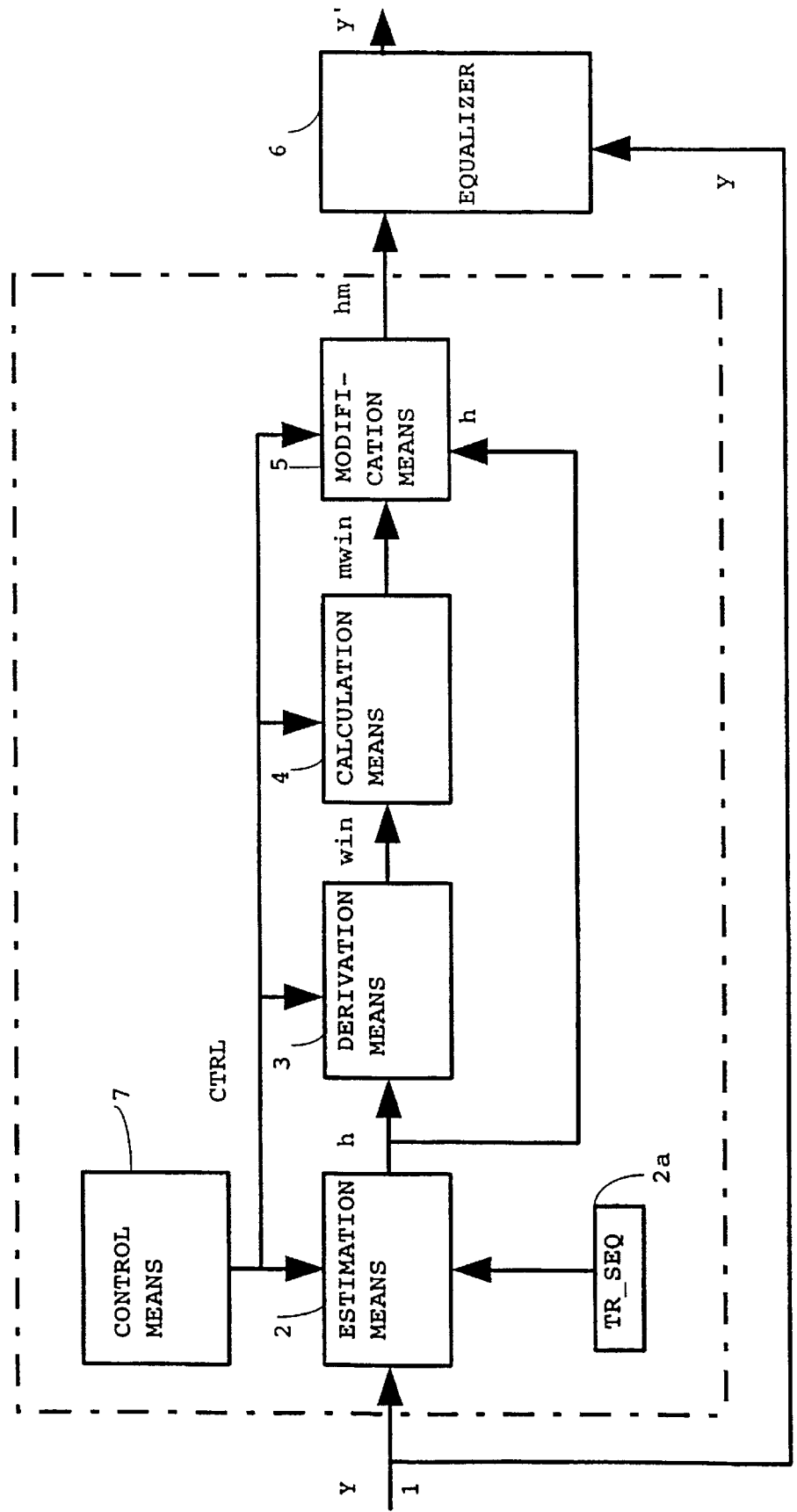
FIG. 1 shows a basic block circuit diagram of a device according to the present invention.

Preferred embodiments of the present invention are now described in detail with reference to the drawings.

According to previous solutions, an estimated channel impulse response function is modified using information contained in the received data stream, i.e. contained in bursts received during time slots of TDMA frames.

In contrast, the present invention proposes to use not only such received burst information, but to additionally use a knowledge of previous (past) channel impulse response functions and to additionally use such history information to modify an estimated channel impulse response function.

The above basic idea of the present invention is described herein below in greater detail. In this connection, the following definitions/assumptions are made.

The behavior of a transmission channel 1 is represented by a model of the channel which assumes a channel to have a certain number of multi-path components. (In the above given example of a base station BS receiving signals s(t) and s(t+T) originating from a mobile station MS, a two-path channel is assumed). For such a channel model, an impulse response function h is determined or estimated, which may be represented as a vector of n components, the number of components being dependent on the number of modeled multi-path components of the channel, and each component can be represented as a complex value having a real and imaginary part. Therefore, if not mentioned otherwise, all subsequently mentioned signals may be assumed to be n-component vector signals in complex representation. Indices k−1, k, etc. represent a mutual time relation between signals. For example, if a current signal is denoted by index (k), a previous signal is denoted by index (k−1).

In the following, the principles of the method according to the present invention are described.

The physical parameters on which the history information can be based are the phase and/or the amplitude of the multi-path channel components. These physical parameters are correspondingly represented by the coefficients of the impulse response function h.

The phase of such multi-path channel components varies rather rapidly. The phase may thus be analyzed to obtain short-term history information concerning the channel impulse responses function. The amplitude of such multi-path channel components varies rather slowly. The amplitude may thus be analyzed to obtain long-term history information concerning the channel impulse response function.

Firstly, an estimated channel impulse response function $h_k$ is estimated at a first time. As is well known, the estimation of an estimated channel impulse response function, in a TDMA system, is based on the detection of a known predetermined training sequence TR_SEQ transmitted at predetermined times as a burst in time slots of a TDMA frame.

Subsequently, based on the estimated channel impulse function $h_k$ and at least one previous history information $win_{k-1}$, new history information $win_k$ is derived. Deriving such new history information $win_k$ may be achieved based on the following relationship:

$$win_k = a*(|Re\{h_k\}|^2 + |Im\{h_k\}|^2 + win_{k-1}) \quad (1)$$

wherein $win_k$ is the new history information, $win_{k-1}$ is the previous history information, a is a predetermined coefficient, $|Re\{h_k\}|^2$ being the square value of the absolute value of the real part of the current impulse response function $h_k$ in complex representation, and $|Im\{h_k\}|^2$ being the square value of the absolute value of the imaginary part of current impulse response function $h_k$ in complex representation, with the sum of $|Re\{h_k\}|^2 + |Im\{h_k\}|^2$ being representative of the square value of the amplitude of the impulse response function $|h_k|^2$. The above relation (1) is evaluated for each vector component i (1<=i<=n) of the impulse response function.

The coefficient a is a factor for scaling or weighting and indicates the extent to which the history information affects the modification of a currently to be modified channel impulse response function h. The coefficient a is set to a value of less than 1 (a<1), for example to a value of 0.25.

Assuming that the method is started to be carried out upon establishing the channel 1 and a very first estimation of the channel impulse response function h is effected, a history information wino should be set to a value of zero since no history is yet available.

Then, based on equation (1), subsequent history information $win_k$ is as follows:

$$win_1 = a*(|h_1|^2 + win_0) = a*|h_1|^2$$
$$win_2 = a*(|h_2|^2 + win_1) = a*|h_2|^2 + a^{2*}|h_1|^2 \quad (2)$$
$$win_3 = a*(|h_3|^2 + win_2) = a*|h_3|^2 + a^{2*}|h_2|^2 + a^{3*}|h1|^2$$

By setting the coefficient a to a value less than 1 it is assured that the influence of the history information gets the smaller the older the history information is. This influence can be further and more quickly reduced when, for example, performing a scaling/weighting with a factor $a^2$, or $a^3$, etc. (a<1) or some other appropriate functional relationship.

Based on the thus derived current history information win, modifying information mwin can be calculated as follows, for each respective vector component:

$$mwin_{i;k} = win_{i;k}/MAX(win_k) \quad (3)$$

with $mwin_{i;k}$ being the i-th vector component of modifying information mwin at a time $t_k$, $win_{i;k}$ being the the i-th vector component of the history information win at the time $t_k$, and $MAX(win_k)$ representing the maximum value of all vector components i (1<=i<=n) of the history information $win_k$ at the time $t_k$. (Other relations for calculating modifying information are also conceivable.)

A thus obtained modification factor mwin remains between zero and one for each vector component of the impulse response function.

Based on thus obtained modifying information, the estimated channel impulse response function h is then modified, for example as indicated below, for each i-th vector component:

$$\begin{aligned} hm_{i;k} &= h_{i;k} * mwin_{i;k} \\ &= (Re\{h_{i;k}\} + Im\{h_{i;k}\}) * mwin_{i;k} \\ &= Re\{h_{i;k}\} * mwin_{i;k} + Im\{h_i; k\} * mwin_{i;k} \end{aligned} \quad (4)$$

It has to be noted that a currently estimated channel impulse response function $h_k$ is modified using modifying information $mwin_k$ which is based on history information $win_{k-1}$ of the previously estimated channel impulse response function $h_{k-1}$ and on the current channel impulse response function $h_k$, thereby obtaining a modified channel impulse response function $hm_k$.

This modified channel impulse response function is then used for equalizing signals y received via the transmission channel in order to reconstruct the initially transmitted signals y'.

A device adapted to implement the above described method is described below with reference to the drawings.

FIG. 1 shows a basic block circuit diagram of a device according to the present invention.

From a sending (transmitting device) like for example a mobile station MS (not shown) initially transmitted signals y' are transmitted. The initially transmitted signals y' are transmitted via a transmission channel 1. The channel 1 may be regarded as the succession of, for example, D/A conversion means and coding/modulation means at the sending side, sending antenna means, air interface, receiving antenna means, A/D-conversion means at the receiving side, like for example at a base station BS. The channel 1 is a multi-path channel, and the initially transmitted signals y' are received as a (distorted) signal y to be equalized.

The signal y is therefore directly supplied to an equalizer means 6, adapted to reconstruct the initially transmitted signals y' from the received signals y. Equalizing a distorted signal is generally achieved by subjecting the received signal y to a processing having the inverse transfer function as that of the channel. To this end, however, the channel impulse response function has to be known.

Therefore, according to the present invention, the received signal y is also supplied to an estimation means 2. The estimation means 2 estimates an estimated channel impulse response function h. The estimation processing is based on only a part of the received signal y, namely the known training sequence TR_SEQ, which is for example stored in a training sequence storing means 2a and used by the estimation means. The training sequence TR_SEQ is only transmitted at predetermined times in the stream of data. Therefore, a control means 7 controls the entire operation of the device by means of a timing control signal CTRL. The control means 7 renders the device operative in cycles, which correspond to the times, during which the training sequence TR_SEQ is transmitted as a burst in time slots of TDMA frames.

The control signal CTRL is thus applied to the estimation means 2 as well as to a derivation means 3, a calculation means 4 and a modification means 5 to be described later.

The estimated channel impulse response function h is represented by a vector signal, with the vector signals representing the respective coefficient values of the impulse response function. The corresponding vector signal (hereinafter also referred to as "the function") is supplied to the derivation means 3 and also to the modification means 5.

Based on the vector signal which represents the estimated channel impulse response function h, the derivation means 3 derives history information win representative of the history of the channel impulse response function h, i.e. taking into account past (previous) parameters of the respective channel impulse response function. These previous parameters are thus representative of changes in the conditions of the transmission channel. Each time the estimation means 2 estimates a channel impulse response function $h_k$, the history information $win_k$ is updated by the derivation means 3. The derivation means 3 always keeps a record of at least the latest history information $win_{k-1}$.

Based on the respective updated history information $win_k$, the calculation means 4 calculates a modifying information $mwin_k$. The modifying information $mwin_k$ is supplied as a control signal to the modification means 5 to modify the vector signal representing the currently estimated channel impulse response function $h_k$.

That is, although there is a certain, but negligible, delay in the processing by the derivation means 3 and the calculation means 4, the modification means 5 modifies a currently estimated channel impulse response function $h_k$ which is based on the currently received signal y using the currently calculated modifying information $mwin_k$.

A vector signal representing a modified channel impulse response function hm is then output from the modification means 5 and supplied as a control signal to the equalizer. The equalizer is controlled by the signal hm and outputs the reconstructed signal y' which closely corresponds to the initially transmitted signal y'.

Figure 2:
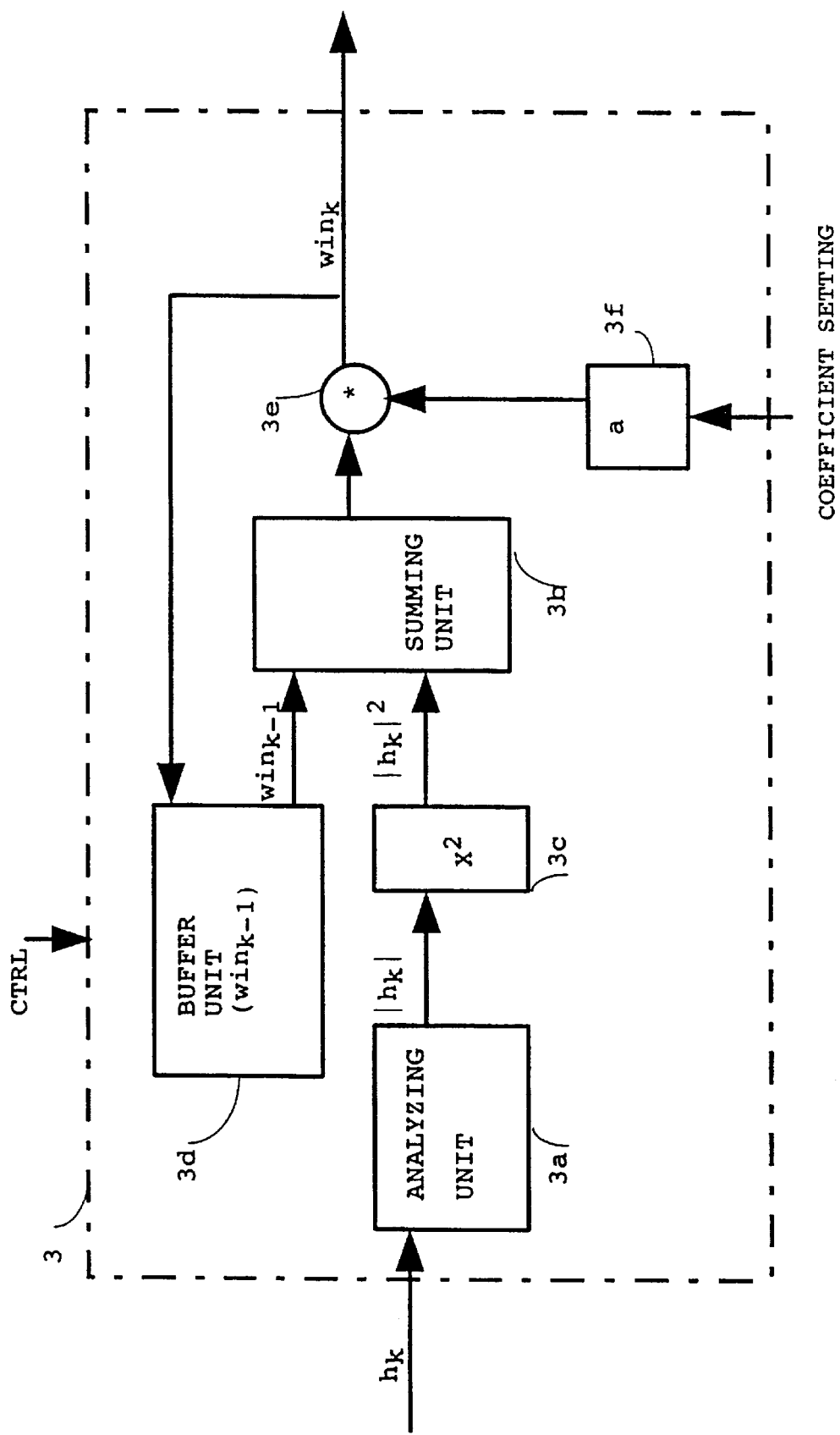
FIG. 2 shows details concerning the implementation of a derivation means in form of a block circuit diagram.

FIG. 2 shows details concerning the implementation of the derivation means 3 in form of a block circuit diagram.

The signal representing the currently estimated channel impulse response function $h_k$ is supplied as a vector signal of n components to the derivation means 3.

The derivation means comprises an analyzing unit 3a which analyzes the vector signal and obtains an analysis result which reflects physical parameters and their time variation of the channel. For example only, the derivation means 3 as shown on FIG. 2 bases the derivation of history information $win_k$ on the amplitude of the multi-path channel components, which are represented by the magnitude of the channel impulse response function signal $|h_k|$. The magnitude signal $|h_k|$ of each respective vector signal component i is then supplied to a squaring unit 3c which obtains the square value $|h_k|^2$ thereof.

The signal representing a respective square value is supplied to a first input terminal of a summing unit 3b. To an other input terminal of the summing unit 3b, a previous history information signal $win_{k-1}$ is supplied. A record of a respective previous history information signal is kept in a buffer unit 3d which temporarily stores the respective previous history information signal $win_{k-1}$. It is to be noted that a value of zero can be stored in the buffer unit as a start value of history information upon initialization of the device, as mentioned above.

The output signal of the summing unit is supplied to a first weighting unit 3e. This first weighting unit 3e weights and/or scales the summing unit output signal with a predetermined coefficient a. The coefficient a can be set by a coefficient setting unit 3f to a desired value, which should be smaller than 1.

The weighted signal $win_k$ output by the first weighting unit 3e is fed back to the buffer unit 3d to be retained therein as a record of the history information which is to be used in a subsequent processing cycle.

The signal $win_k$ is also output from the derivation means as a history information vector signal of n components and supplied to the calculation means 4.

Figure 3:
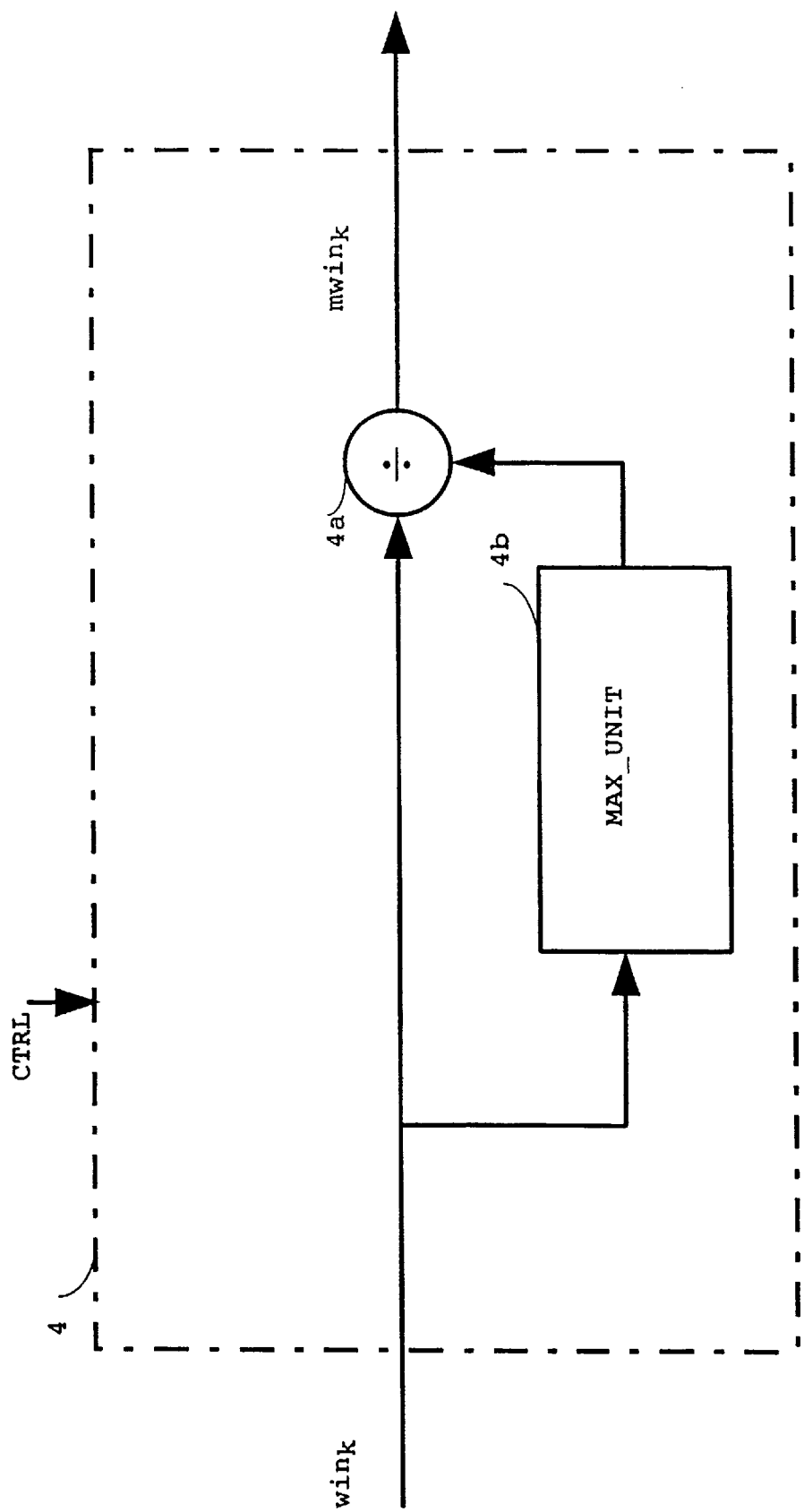
FIG. 3 shows details concerning the implementation of a calculation means in form of a block circuit diagram.

FIG. 3 shows details concerning the implementation of the calculation means 4 in form of a block circuit diagram The history information signal $win_k$ which is output from the derivation means 3 is supplied to a second weighting unit 4a forming part of the calculation means 4. The history information signal $win_k$ is branched within the calculation means 4 to be supplied to a maximum determination unit 4b as another part of the calculation means 4. The maximum determination unit 4b is adapted to output a signal corresponding to the one of the vector component signals $win_{i;k}$ of the history information vector signal $win_k$ having the maximum value among all currently supplied vector component signals. Each respective vector component signal $win_{i;k}$ is then weighted by means of said second weighting unit 4a in that it is subjected to a division by said maximum value signal. The weighted signal output from the second weighting unit 4a is output as a modifying information signal $mwin_k$ to the modification means 5.

The modification means 5 may be realized as a simple multiplication means which multiplies each component i of the signal h representing the channel impulse response function with the respective component i of the modifying information signal mwin, thereby outputting a vector signal representing the modified channel impulse response function hm to be supplied to the equalizer means 6 for signal reconstruction.

As mentioned above, the present invention may advantageously be combined with other concepts for modifying a channel impulse response.

Figure 4:
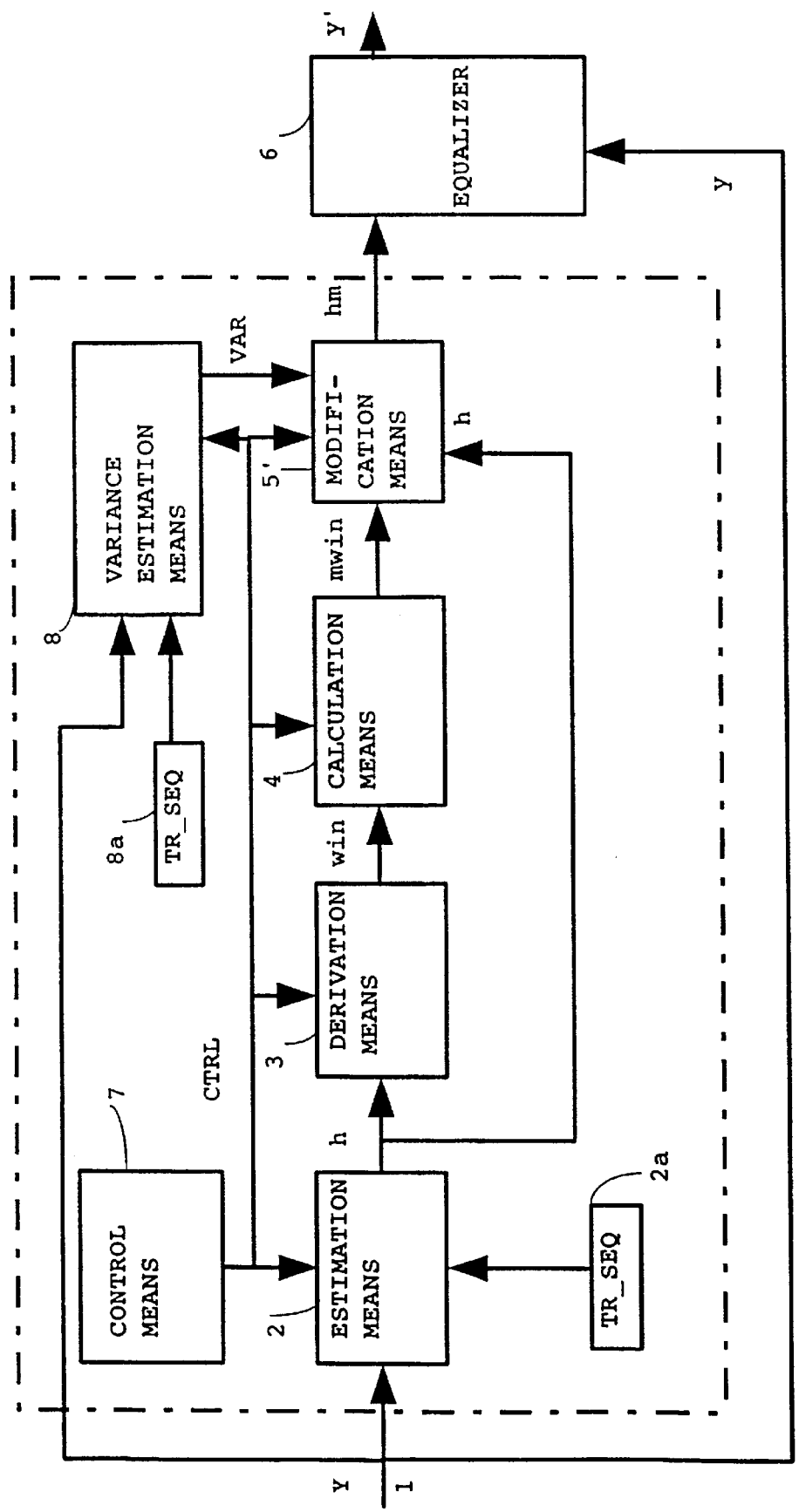
FIG. 4 shows the basic block diagram of the present invention when combined with other structures for channel impulse response function improvements, as for example proposed in the recently filed international application number PCT/EP98/04562.

FIG. 4 shows the basic block diagram of the present invention when combined with a structure for modification of channel impulse response function, as for example proposed in the recently filed international application number PCT/EP98/04562 of the present applicant.

The structure is substantially similar to the one depicted in FIG. 1. The differences are as follows.

A variance estimation means 8 (also controlled by the signal CTRL) and an associated training sequence storing means 8a are additionally provided. (However, the storing means 8a may be identical to the storing means 2a explained above). The variance estimation means 8 is adapted to operate according to the method as proposed in the application PCT/EP98/04562 and outputs a control signal VAR supplied to a modification means 5'. Fort further details concerning the operation of the variance estimation means 8 the reader is referred to the application PCT/EP98/04562.

The modification means 5' depicted in FIG. 4 is adapted to modify the signal representing the channel impulse response function h based on two control signals, i.e. mwin obtained as described herein above and VAR to be obtained as described in the above mentioned previous application PCT/EP98/04562.

Furthermore, another modification (not shown in the figures) is conceivable. According to such a further modification, the variance estimation could be performed after channel impulse response modification according to the present invention. This means, that one input terminal of the means 8 is to be connected the output of the modification means 5 (of FIG. 1), thereby being supplied with the signal hm, and the control signal VAR is to be connected to a further modification means operated according to the principles as set out in said previous application, to thereby output a "modified modified" channel impulse response signal (two-stage or cascaded modification) to be supplied to the equalizer 6.

It should be understood that the above description and accompanying figures are only intended to illustrate the present invention by way of example, only. The preferred embodiments of the present invention may thus vary within the scope of the attached claims.

What is claimed is:

1. A method for processing received signals having been transmitted via a transmission channel, comprising the steps of:

estimating an estimated impulse response function ($h_k$) of said channel based on received signals (y) which are received at a first time ($t_k$);

deriving history information ($win_k$) based on at least one previously estimated impulse response function, calculating modifying information ($mwin_k$) on the basis of said history information ($win_k$), and modifying said estimated impulse response function ($h_k$) of said channel obtained on the basis of said received signals (y), by applying said modifying information ($mwin_k$) to said estimated impulse response function ($h_k$) of said channel obtained on the basis of said received signals (y), thereby obtaining a modified impulse response function ($hm_k$), characterized in that said history information ($win_k$) is derived on the basis of the amplitude ($|h_k|$) of said impulse response function ($h_k$), a new history information ($win_k$) is derived on the basis of the sum of the square amplitude ($|h_k|^2$) of a current impulse response function ($h_k$) and previous history information ($win_{k-1}$)

each new history information ($win_k$) is weighted by a predetermined factor (a), which factor defines the influence of the history for impulse response function modification, and each new history information is calculated using an equation of $$win_k = a*(|Re\{h_k\}|^2 + |Im\{h_k\}|^2 + win_{k-1}),$$

with $win_k$ being the new history information, $win_{k-1}$ being the previous history information, a being the predetermined factor, $|Re\{h_k\}|^2$ being the square value of the absolute value of the real part of the current impulse response function $h_k$ in complex representation, and $|Im\{h_k\}|^2$ being the square value of the absolute value of the imaginary part of current impulse response function $h_k$ in complex representation, with the sum of $|Re\{h_k\}|^2 + |Im\{h_k\}|^2$ being representative of the amplitude of the impulse response function ($h_k$).

2. A method according to claim 1, further comprising the step of equalizing said received signals (y) by using said modified impulse response ($hm_k$) in order to reconstruct said signals (y') having initially been transmitted.

3. A method according to claim 1, wherein said signals (y) are transmitted in units of bursts according to a TDMA method, and further comprising a step of controlling said step of estimating an estimated impulse response function ($h_k$) of said channel such that said estimated impulse response function is obtained at respective times, at which times a burst containing a predetermined training sequence (TR_SEQ) is being received.

4. A method according to claim 1, wherein said predetermined factor(a) is set to a value less than one.

5. A method according to claim 1, wherein said impulse response function (h), said history information (win), and said modifying information (mwin) are represented as vectors of a plurality of components i (1<=i<=n), with the number n being determined based on the adopted channel model and the number n corresponds to the number of paths assumed for multipath signal propagation on the channel, and the respective method steps are performed for each vector component.

6. A method according to claim 5, wherein an i-th component of said modifying information ($mwin_{i;k}$) is determined by weighting the corresponding vector component of the current history information ($win_{i;k}$) with the maximum value among said n vector components of the current history information ($max(win_k)$) as follows $$mwin_{i;k} = win_{i;k}/max(win_k).$$

7. A method according to claim 6, wherein said modified impulse response function ($hm_k$) is obtained by multiplying said currently estimated impulse response function ($h_k$) with said modifying information ($mwin_k$) for each vector component:

$$hm_{i;k} = h_{i;k} * mwin_{i;k}$$
$$= (Re\{h_{i;k}\} + Im\{h_{i;k}\}) * mwin_{i;k}.$$

8. A device for processing received signals (y) having been transmitted via a transmission channel (1) comprising:

estimation means (2, 2a) adapted to obtained an estimated impulse response function ($h_k$) of said channel (1) based on said received signals (y) which are received at a first time;

derivation means (3; 3a–3f) adapted to derive history information ($win_k$) based on at least one previously estimated impulse response function.

calculation means (4; 4a, 4b) adapted to calculate modifying information ($mwin_k$) on the basis of said history information ($win_k$), and modification means (5) adapted to modify said estimated impulse response function ($h_k$) of said channel (1) obtained on the bass of said received signals (y), by applying said modifying information ($mwin_k$) to said estimated impulse response function ($h_k$) of said channel obtained on the basis of said received signals (y), and adapted to output a modified impulse response function ($hm_k$), characterized in that said derivation means (3) comprises a first analyzing unit (3a) adapted to derive the amplitude ($|h_k|$) of said impulse response function ($h_k$), and said derivation means (3) is adapted to derive the history information ($win_k$) on the basis of said amplitude, said derivation means (3) comprises a summing unit (3b) adapted for summing the output of a squaring unit (3c) outputting the square amplitude ($|h_k|^2$) of a current impulse response function ($h_k$) and the output of a buffer unit (3d) temporarily storing a previous history information ($win_{k-1}$), said derivation means (3) further comprises a first weighting unit (3e) adapted to weight said output signal of said summing unit (3b) with a preset coefficient (a), which coefficient defines the influence of the history for impulse response modification, and said derivation means (3) is arranged to output an output signal which represents a respective new history information according to the following signal processing $$win_k = a*(|Re\{h_k\}|^2 + |Im\{h_k\}|^2 + win_{k-1}),$$

with $win_k$ being the new history information signal, $win_{k-1}$ being the previous history information signal temporarily stored in said buffer unit, a being the preset coefficient, $|Re\{h_k\}|^2$ being the square value of the absolute value of the real part of the current impulse response function $h_k$ in complex representation, and $|Im\{h_k\}|^2$ being the square value of the absolute value of the imaginary part of current impulse response function $h_k$ in complex representation, with the sum of $|Re\{h_k\}|^2 + |Im\{H_k\}|^2$ being representative of the amplitude of the impulse response function ($h_k$).

9. A device according to claim 8, further comprising equalizer means (6) adapted to equalize said received signals (y) based on said modified impulse response ($hm_k$) which is supplied thereto as a control signal, and outputting said signals (y') having initially been transmitted.

10. A device according to claim 8, wherein said signals (y) are transmitted in units of bursts according to a TDMA method and further comprising control means (7) adapted to control said estimation means (2, 2a) such that said estimation means is rendered operative at respective times, at which times a burst containing a predetermined training sequence (TR_SEQ) is being received.

11. A device according to claim 8, wherein
said preset coefficient (a) is set in a coefficient setting unit (3f) to a value less than one.

12. A device according to claim 8, wherein said impulse response function (h) signal, said history information (win) signal, and said modifying information (mwin) signal are represented as vector signals of a plurality of vector component i (1<=i<=n), with the number n being determined based on the adopted channel model and corresponding to the number of paths assumed for multi-path signal propagation on the channel, and the respective devices are adapted for parallel processing of the respective vector components.

13. A device according to claim 12, wherein said calculation means (4) comprises a second weighting unit (4a) adapted to perform a signal processing yielding each i-th component of said modifying information ($mwin_{i;k}$) signal by weighting the corresponding i-th vector component signal of the current history information ($win_{i;k}$) with a maximum value signal among said n vector component signals of the current history information ($max(win_k)$) signal, said maximum value signal being provided at the output of a maximum determination unit (4b), as follows:

$$mwin_{i;k} = win_{i;k}/\max(win_k).$$

14. A device according to claim 13, wherein
said modification means (5) is adapted to perform a signal processing yielding said modified impulse response function ($hm_k$) signal based on multiplying said currently estimated impulse response function ($h_k$) signal with said modifying information ($mwin_k$) signal for each vector component signal:

$$hm_{i;k} = h_{i;k} * mwin_{i;k}$$
$$= (\text{Re}\{h_{i;k}\} + \text{Im}\{h_{i;k}\}) * mwin_{i;k}.$$

* * * * *